(12) United States Patent
Pilon

(10) Patent No.: US 7,599,805 B2
(45) Date of Patent: Oct. 6, 2009

(54) SYSTEMS AND METHODS FOR PREDICTING SUPERSONIC ACOUSTIC SIGNATURES

(75) Inventor: Anthony R. Pilon, Lancaster, CA (US)

(73) Assignee: Lockheed-Martin Corporation, Bethesda, MD (US)

( * ) Notice: Subject to any disclaimer, the term of this patent is extended or adjusted under 35 U.S.C. 154(b) by 2 days.

(21) Appl. No.: 11/684,923

(22) Filed: Mar. 12, 2007

(65) Prior Publication Data

US 2008/0228413 A1    Sep. 18, 2008

(51) Int. Cl.
G06F 17/40 (2006.01)
G06F 17/00 (2006.01)
(52) U.S. Cl. .......................... 702/39; 702/56; 702/103; 244/1 N; 701/10
(58) Field of Classification Search .................. 702/39, 702/56, 103
See application file for complete search history.

(56) References Cited

U.S. PATENT DOCUMENTS

| 5,023,847 A | * | 6/1991 | Lee ............................. 367/136 |
| 6,905,091 B2 | * | 6/2005 | Berson et al. ............... 244/1 N |
| 7,121,511 B2 | * | 10/2006 | Kremeyer ................... 244/130 |
| 7,248,985 B2 | * | 7/2007 | Dwyer et al. ............... 702/108 |

* cited by examiner

Primary Examiner—Hal D Wachsman
(74) Attorney, Agent, or Firm—Koestner Bertani LLP; Mary Jo Bertani

(57) ABSTRACT

A system for determining an acoustic signature of a device is disclosed that includes a computer processor operable to determine strength and location of shock wave sound signals based on propagation of sound waves generated by the device. The strength and location of the shock wave signals are modified due to dissipation and dispersion effects in a non-uniform atmosphere. The shock wave signals are separated into even and odd numbered signals, and oscillations in the signals are smoothed by averaging even and odd numbered shock signals.

28 Claims, 4 Drawing Sheets

SYSTEMS AND METHODS FOR PREDICTING SUPERSONIC ACOUSTIC SIGNATURES

BACKGROUND

Sonic boom signals are produced by the nonlinear propagation of shock waves and pressure disturbances generated by supersonically traveling aircraft, missiles, artillery projectiles, etc. The annoyance and startle caused by these impulsive, high amplitude sound signals has hampered previous attempts at the development of civil supersonic transport aircraft. For example, the Anglo-French Concorde was not allowed to fly supersonically over land, because of the unacceptable public response to the high amplitude sonic boom signals it generated.

In spite of the challenges presented by the sonic boom phenomenon, supersonic cruise flight remains a goal for many in the aerospace industry who have concluded that business jets with supersonic cruise capabilities are technically feasible. However, supersonic flight over land may be required for a supersonic business jet to be profitable. Therefore, the sonic boom signals must be "minimized" in order to reduce or eliminate public annoyance. Some means of quantifying the "loudness," "noisiness" or "intensity" of a sonic boom signal will be required in order to determine what signals, and therefore what type of supersonic cruise aircraft, will be acceptable for supersonic overland flight.

Most contemporary sonic boom prediction tools approximate the strong compressions in a sonic boom signal as zero-thickness shock waves. The relative motion and coalescence of these shock waves are governed by the Rankine-Hugoniot relations of gas dynamics. These zero-thickness shocks do not directly allow for the calculation of noise metrics, because spectral analysis cannot be performed.

SUMMARY

In one embodiment, a system for determining an acoustic signature of a device is disclosed that includes a computer processor operable to determine strength and location of sound signals based on propagation of sound and shock waves generated by the device. The strength and location of the shock waves within signals are modified due to dissipation and dispersion effects in a non-uniform atmosphere. The discretized signals are separated into even and odd numbered signals, and oscillations near shock waves are smoothed by averaging even and odd numbered shock signals.

In another embodiment, a method for predicting the acoustic signature of a device includes determining the strength and location of shock waves in sound signals based on propagation of sound waves generated by the device. The strength and location of the shock waves is modified due to dissipation and dispersion effects in a non-uniform atmosphere. A first shock wave signal is determined that pertains to a distorted acoustic wave. A second shock wave signal is determined that is interpolated from the distorted signal and used in dispersive calculations and spectral analysis.

BRIEF DESCRIPTION OF THE DRAWINGS

Embodiments of the invention relating to both structure and method of operation, may best be understood by referring to the following description and accompanying drawings.

DETAILED DESCRIPTION

Systems and methods described herein enable resolution of the spectral characteristics of a sonic boom signal while taking into account the effects of propagation through a real atmosphere, winds, aircraft maneuvers, etc. Additionally, the complicated interactions and reflections that occur when a propagating sonic boom signal reaches the ground are also taken into account.

Nomenclature

The following terminology may be useful in understanding the present disclosure. It is to be understood that the terminology described herein is for the purpose of description and should not be regarded as limiting.

Figure 1:
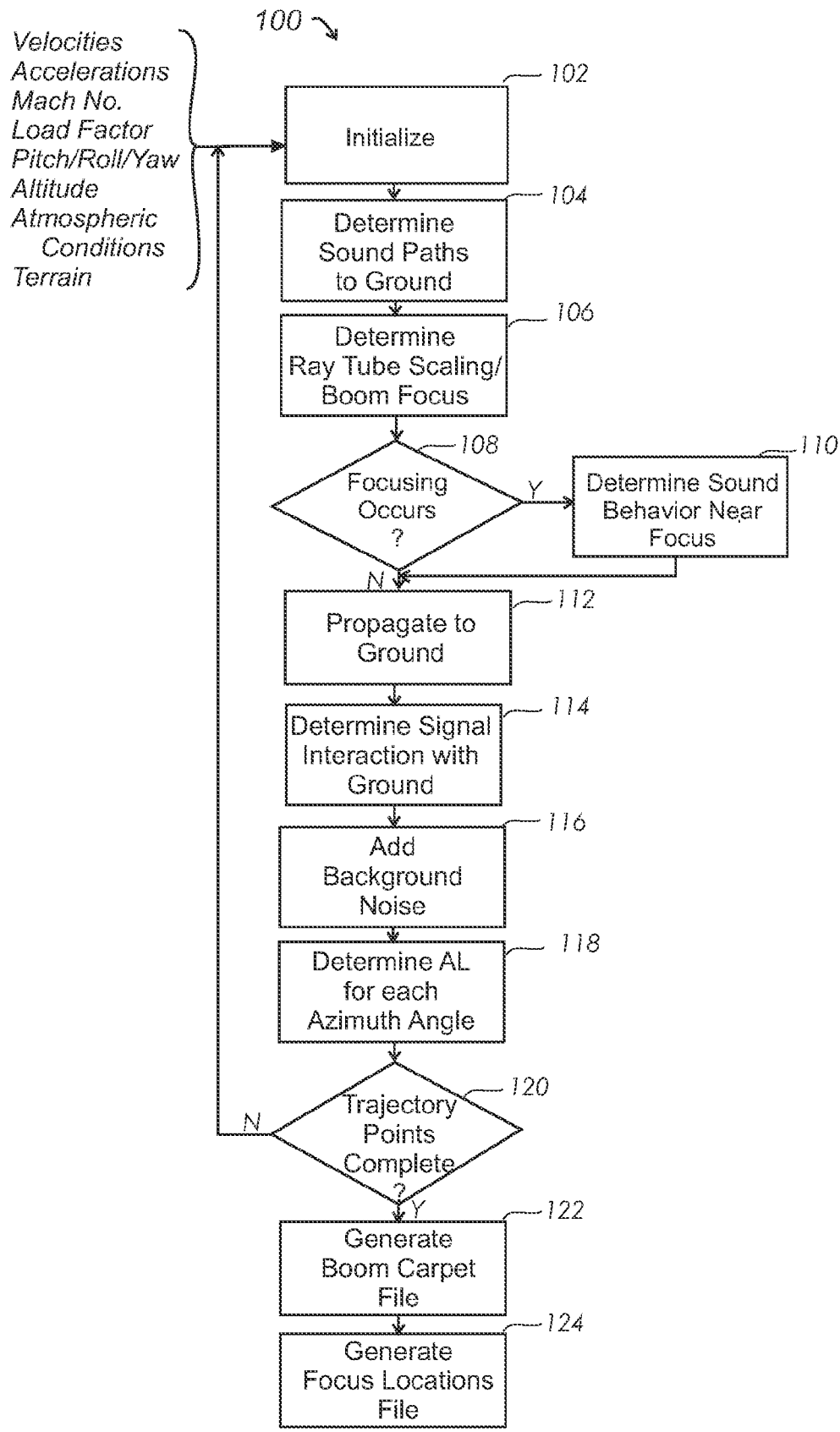
FIG. 1 is a flow diagram of an embodiment of a process for determining the acoustic level of a device.

$\hat{n}$ Unit vector in direction of propagation
$\hat{P}$ Fourier transform of the pressure signal
$\vec{w}$ Wind vector
$\vec{x}$ Ray location vector
$\vec{y}$ Ray trajectory
A Amplitude function
a Speed of sound
$a_\infty$ Reference sound speed
$A_r$ Oxygen relaxation dissipation and dispersion coefficient
$B_r$ Nitrogen relaxation dissipation and dispersion coefficient
$C_{tv}$ Thermoviscous dissipation coefficient
k Wave number
L Atmospheric length scale
p' Acoustic pressure
S Ray tube cross sectional area
s Propagation distance
t Time
t' Retarded time
W Wavefront function
Subscripts
o Ambient air quantities
Symbols
$\Delta x_d$ Dissipation propagation distance
$\Delta x_s$ Shock formation distance
Γ Gol'dberg number
γ Ratio of specific heats
$\vec{\alpha}$ Atmospheric absorption coefficient
λ Wavelength
ω Cyclic frequency
ρ Air density Referring to FIG. 1, a flow diagram of an embodiment of sonic boom acoustic level (AL) determination logic 100 is shown. Process 100 can be performed in a simulated environment, an analysis workstation, as well as onboard a vehicle, such as an aircraft, during operation. While the examples described herein pertain to an aircraft, the systems and methods described can be applied to determine the acoustic levels of any suitable device.

The aircraft's current flight characteristics are input to initialization process 102. The information provided to process 102 can include velocities, accelerations, Mach number, load factor, attitude angles (pitch, roll, and yaw), altitude, atmospheric conditions, terrain information, as well as other suitable information. Process 102 can receive input from a user, from sensors, from remote data sources, and/or other suitable sources. User input may be provided via an interactive user interface and/or via a data file. Table 1 shows the parameters a user may specify in an analysis environment.

TABLE 1

Initialization Data

| Parameter | Description |
| --- | --- |
| Atmospheric properties | Specifies atmospheric properties file/data that includes standard, cold, hot, and/or other atmospheric data/profiles. The atmospheric data can include, for example, altitude, the ambient static temperature, ambient static pressure, the relative humidity, the mean wind speed, and/or the direction from which the wind blows. |
| Time step | Time increment used in numerical integration and differentiation to calculate the propagation paths (rays). |
| Propagation increment along the ray tube | Sets the path length increment used in the Burgers' equation, as further described herein. |
| Azimuthal increment | The azimuthal increment in the output files. For example, if this increment is 10.00, boom signals will be calculated at 10 degree azimuthal increments, with 0 degrees being directly below the aircraft. Note that these angles are relative to the input geometry, and are not the ground intercept angles relative to the aircraft. |
| Altitude interval | Attenuation will be calculated, and intermediate signals generated, at this interval as the signal is propagated. This variable is the altitude change between atmospheric absorption applications. This variable can also control the output of intermediate boom signals for each of the altitudes between the flight and ground altitudes, for the 0 degree azimuth. |
| Ground intercept altitude | This variable sets the ground elevation (above mean sea level) for the predictions. |
| Ground surface type | Used to approximate the effects of acoustically hard or soft ground planes. |
| Ground incoherence factor and ground specific flow resistance | Used to calculate the effects of acoustically hard or soft ground planes. |
| Spectral analysis rate, Spectral analysis time | Ground signals are interpolated to this sample rate, for this time, before calculating noise metrics. |
| Output format | Sets the format of the output files, e.g., comma separated values or binary files for data plotting. |
| Background noise spectrum | Indicates whether background noise should be added to a signal. Parameter can specify a full path name of the background noise file containing noise levels. Parameter can also be used to indicate that no background noise is desired. |
| Initial steady state conditions | Steady state conditions, or the initial conditions, for acceleration or maneuver predictions. The conditions can include, for example, Mach number, flight altitude, flight path angle, aircraft heading, and roll angle. |
| Number of input conditions | Number of input condition files that will be used in the current run. |
| Time step | Transient (maneuvers, accelerations) time step |
| Output directory | Default output directory for results. |
| Time at point | Total amount of time the aircraft will be at the condition for each of the input conditions |
| Name of pressure cylinder input file(s) | File path name(s) of the pressure cylinder file associated with each input condition. The pressure cylinder files contain the static pressure signals near the aircraft. |
| Transient rates | The transient rates for flight conditions, such as acceleration, pitch rate, turn rate, and roll rate. |

Process 102 can include determining the static pressure signal in the aircraft near field. In a simulated environment, this near field signal can be extracted from a computational fluid dynamics (CFD) solution of the flow around the aircraft. If the aircraft is accelerating or maneuvering, the signal can be generated or suitably modified to take the time dependent nature of the maneuvers into account. The near field signal is typically generated close enough to the aircraft that the numerical dissipation inherent in CFD solvers does not destroy the fidelity of the signal. However, the signal is also typically determined far enough away from the aircraft to avoid cross flow and lift distribution effects dominating the propagation.

Figure 2:
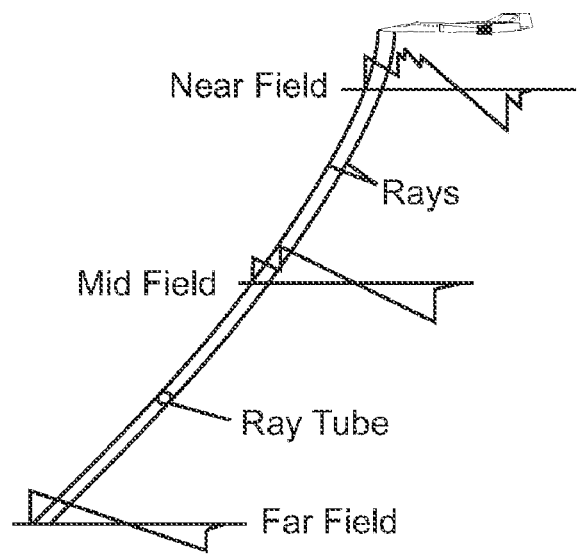
FIG. 2 is a diagram showing examples of shock waves and the shape of N-wave pressure disturbances generated by an aircraft operating at supersonic speed.

Process 104 includes determining sound paths to the ground. Referring to FIG. 2, a diagram of sound propagation paths, or rays, emanating from the nose of an aircraft to the ground is shown. At a given point, the passage of the shock wave causes an initial sudden rise in static pressure followed by a gradual fall to below the ambient pressure and then a sudden rise back to normal. These pressure fluctuations are referred to as N-waves. In some embodiments, the effects of sonic boom propagation through a stratified, moving atmosphere can be predicted with a ray tracing and geometrical acoustics approach. Sound propagation in a layered atmosphere can be considered, with ambient temperature, pressure and sound speed varying with height above the earth. Ignoring winds and gravitational gradients, the governing wave equation is $$\frac{\partial^2 p'}{\partial t^2} - \rho_o a_o^2 \vec{\nabla} \cdot \frac{1}{\rho_o} \vec{\nabla} p' = 0 \quad (1)$$

A solution is sought in the form $$p'(\vec{x}, t) = A(\vec{x}) \exp\left[i\omega\left(t - \frac{W(\vec{x})}{a_\infty}\right)\right] \quad (2)$$

where $\vec{x}$ is a location vector, $\omega$ is the cyclic frequency, $a_\infty$ is a fixed reference sound speed, A is the three dimensional amplitude function, and W is a three dimensional wavefront function. Substituting equation (2) for p' in the wave equation (1) and taking the real and imaginary parts yields $$1 - \frac{a_o^2}{a_\infty^2}(\vec{\nabla} W)^2 = \frac{a_0^2}{\omega^2}\left(\frac{\vec{\nabla}\rho_o}{\rho_o} \cdot \frac{\vec{\nabla} A}{A} - \frac{\nabla^2 A}{A}\right) \quad (3)$$

$$\nabla^2 W + \vec{\nabla} W \cdot \left(2\frac{\vec{\nabla} A}{A} - \frac{\vec{\nabla}\rho_o}{\rho_o}\right) = 0 \quad (4)$$

Assuming the wavelength of the propagating sound, $\lambda$, is much less than the length scale of atmospheric gradients, L, i.e. $\lambda << L$, equation (3) becomes $$1 - \frac{a_o^2}{a_\infty^2}(\vec{\nabla} W)^2 = 0 \quad (5)$$

If $\vec{n}$ is defined as the unit vector in the local direction of propagation, equation (5) becomes $$\vec{\nabla} W = \frac{a_\infty}{a_o}\vec{n} \quad (6)$$

and equation (4) becomes $$\vec{\nabla} \cdot \left(\hat{n} \frac{A^2}{\rho_o a_o}\right) = 0 \quad (7)$$

Defining a "ray tube" as a grouping of rays, analogous to a stream tube in fluid dynamics, and integrating equation (7) over the ray tube cross sectional areas, S, gives $$A\left(\frac{S}{\rho_o a_o}\right)^{\frac{1}{2}} = \text{constant} \quad (8)$$

In the absence of winds, equations (5) and (8) are used to generate ray tubes, and scale sound amplitudes with respect to plane wave propagation. Similar equations for atmospheric propagation in the presence of winds are given by $$\xi^2 - \frac{a_o^2}{a_\infty^2}(\vec{\nabla} W)^2 = 0 \quad (9)$$

$$\left(\frac{A^2 S}{\xi^2 \rho_o a_o}\right) = \text{constant} \quad (10)$$

where $$\xi = \left(1 + \frac{\vec{\omega}_o}{a_o} \cdot \hat{n}\right)^{-1} \quad (11)$$

and $\vec{\omega}_o$ is the ambient wind vector. The rays are then defined by trajectories $$\vec{y} = a_o \hat{n} + \vec{\omega} \quad (12)$$

The ray tracing scheme employed process 104 can be based on equations (9) through (12). A predictor-corrector scheme can be employed, incrementing in time from the aircraft near field location through the layered atmosphere to a location on the ground. Each ray's initial trajectory is determined by the speed and direction of the aircraft. For steady level flight, the initial trajectory is orthogonal to the aircraft Mach cone. A ray tube, composed of multiple rays, for example, 4 rays, calculated with the incremental approach, can be used to determine the amplitude of the sonic boom signal. Equation (10) shows that the signal amplitude is inversely proportional to the ray tube area at any time during propagation. Acceleration, maneuvering, or atmospheric winds will often cause the area of a ray tube to approach zero. Since the signal amplitude is inversely proportional to the ray tube area, large amplification of the sonic boom signals can occur as the area of the ray tube approaches zero.

Figure 3A:
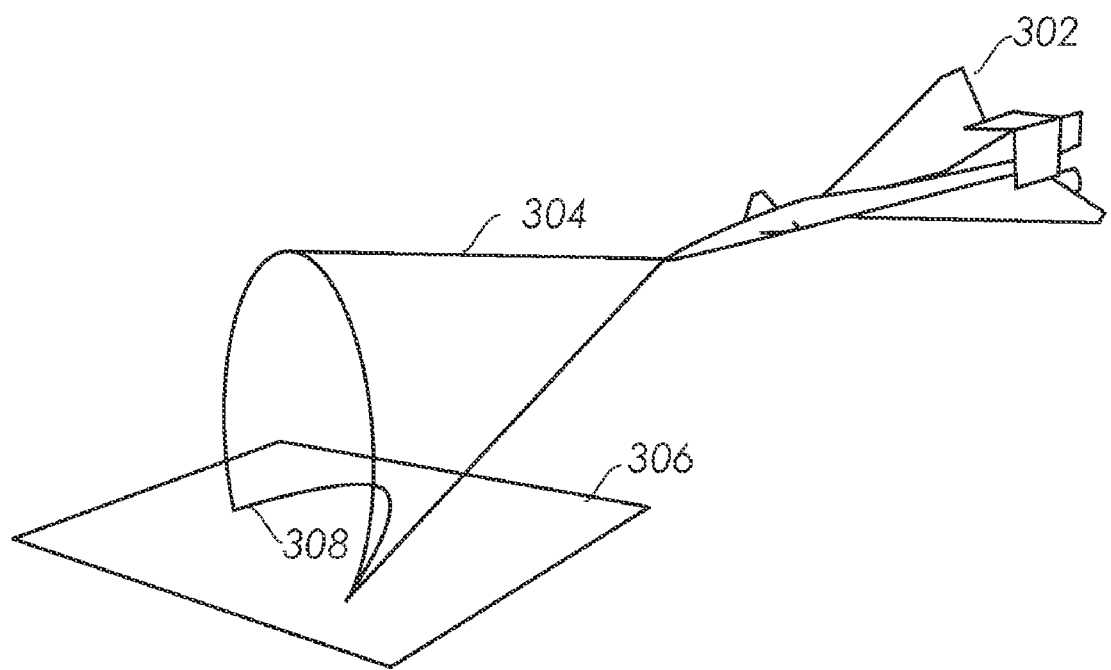
FIG. 3A is a diagram depicting a perspective view of the footprint of a sonic "carpet" boom generated by an aircraft traveling at supersonic speed.
Figure 3B:
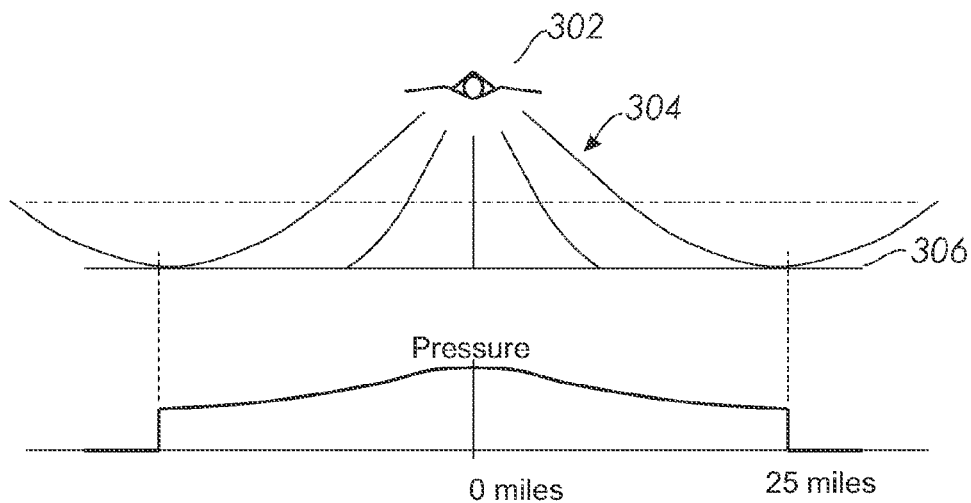
FIG. 3B is a front view of the carpet boom depicted in FIG. 2A and a graph indicating the relative strength of the sonic boom at various distances from the aircraft.

If the aircraft is maneuvering or accelerating, a series of ray tubes can be determined in order to capture the effects of the maneuver in process 106. Referring to FIG. 3A, when aircraft 302 moves faster than the speed of sound and begins to outrun the pressure wave, ray cone 304 spreads forward from the nose of aircraft 302. The sonic boom heard at ground level 306 is the intersection of the ground 306 and the ray cone 304, and is referred to as a "carpet boom." Ray cone 304 spreads broadly beneath aircraft 302, as depicted in FIG. 3B. In general, ray cone 304 at ground level 306 will be approximately one mile wide for every thousand feet of altitude of aircraft 302. Therefore, a ray cone 304 generated at 50,000 feet above ground level will be approximately fifty miles wide at ground level 306. Ray cone 304 typically strikes ground level 306 forward of the point at which ray cone 304 is created, and continues along the route of aircraft 302 until aircraft 302 is moving slower than the speed of sound.

The strength of the sound signals propagating along ray cone 304 is affected by various factors including the size, weight, speed, altitude, and angle of attack of aircraft 302, as well as roll, pitch, and yaw angle during flight. Atmospheric and terrain variations can also affect the intensity of shock wave 304. Variables that are under the pilot's control, such as speed, acceleration, and attitude angles, are also important. Increasing temperatures in the troposphere tend to diffuse the sound signals and shock waves propagating along ray cone 304. The strength of the signals along ray cone 304 is typically the highest directly ahead of aircraft 302 at the time of sound generation, and reduces in strength with increasing distance from aircraft 302. The sound signals propagating along ray cone 304 typically reflect off ground 306.

Figure 3C:
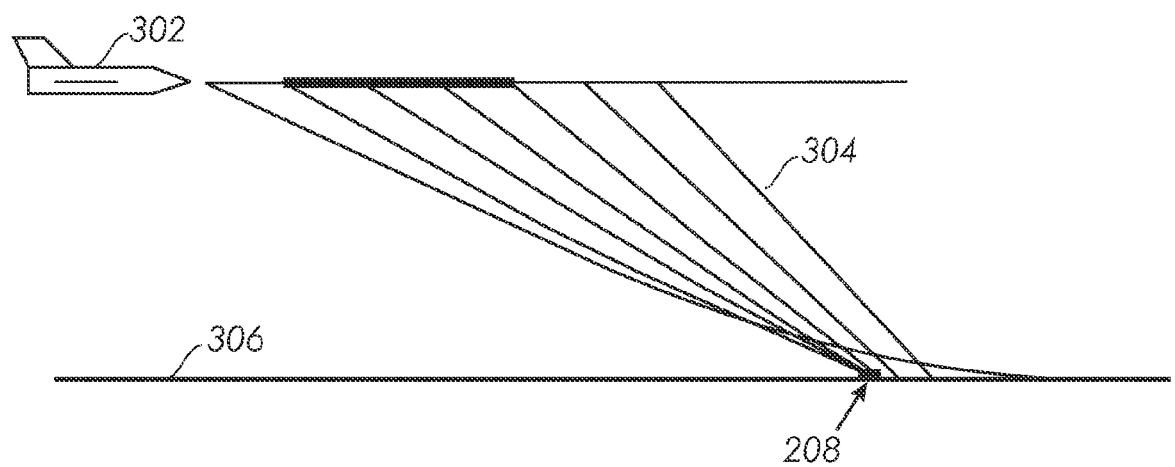
FIG. 3C is an aircraft centerline view of an acceleration focus.

Changing the acceleration, angle of attack, pitch, roll, or yaw attitude of aircraft 302 can either focus or diffuse ray cone 304. A focused ray cone 304 occurs when two or more wavefronts 308, originating at different times from aircraft 302, coincide exactly, as shown in FIG. 3C. In general, deceleration and/or lifting the nose of aircraft 302 will diffuse the sound signals in ray cone 304; acceleration and/or dropping the nose will focus the sound signals in ray cone 304. A change in horizontal direction will focus ray cone 304 along the inside of the sonic boom carpet's turn, which is often along a track to the inside of the flight path.

Referring again to FIG. 1, process 106 includes determining ray tube scaling effects and/or determining the location of boom focusing (zero ray tube area). In this process, a ray tube composed of four rays is composed at each aircraft azimuthal angle, for each temporal point in the supersonic trajectory. Vector cross-products are used to calculate the ray tube cross-sectional area as the rays are traced to the ground. Focusing occurs whenever a zero ray tube area is encountered.

Process 108 includes determining whether the signals are focused, which can occur when an aircraft is accelerating, turning, and/or pitching downward. If the signals are focused, process 110 includes determining sound behavior near the focus area. In some embodiments, the behavior is determined using the nonlinear Tricomi equation, which governs the behavior of sound propagation near a fold caustic. This equation is solved through an iterative process on an unsteady, pseudo-time version of the equation, where diffraction effects and nonlinear effects have been separated.

Process 112 includes nonlinearly propagating the pressure signal to the receiver location on or near the ground. If the boom signal is propagated through a non-uniform or windy atmosphere, ray tracing and geometric acoustics can be employed to determine the propagation path and the effects of acoustical spreading. The nonlinear propagation of sound in the atmosphere is governed by Burgers' equation. The lossless form of Burgers' equation is $$\frac{\partial p'}{\partial x} = \frac{\beta}{2\rho_o a_o^3} \frac{\partial (p')^2}{\partial t'} \quad (13)$$

where p' is the acoustic (disturbance) pressure, x is the propagation distance, $\rho_o$ is the ambient air density, $\alpha_o$ is the ambient air speed of sound, t' is the retarded time, and $\beta$ is the coefficient of nonlinearity. For sound propagation in air, $\beta=(\gamma+1)/2$, where $\gamma$ is the ratio of specific heats. If the pressure signal at any point along the propagation path is taken as $$p'(x,t')=f(t) \quad (14)$$

then the solution at $x+\Delta x$ is $$p'(x+\Delta x, t') = f\left(t' + \frac{p'\beta\Delta x}{\rho_o a_o^3}\right) \quad (15)$$

The second term on the right side above determines the nonlinear distortion of the signal, and can lead to multi-valued waveforms. Before a waveform becomes multi-valued, however, a shock (infinite slope in the pressure signal) is formed. The distance $\Delta x_s$, from the current point on the propagation path, at which a shock first forms can be determined by calculating the location where the slope of the pressure signal becomes infinite, so that $$\Delta x_s = \frac{\rho_o a_o^3}{\beta \cdot \max\left(\frac{\partial f}{\partial t'}\right)} \quad (16)$$

In plane wave acoustic propagation, the signal is propagated along a line, while calculating the local shock formation distance, $\Delta x_s$. If the shock formation distance is less than the local marching step, the code propagates the shorter distance, and forms a zero thickness shock in the solution. The pressure jumps and speed of the shocks formed in the signal are determined using the Rankine-Hugoniot relations $$\rho_1 u_1 = \rho_2 u_2 \quad (17)$$

$$p_1+\rho_1 u_1^2=p_2+\rho_2 u_2^2 \quad (18)$$

$$u_1(p_1+\rho_1 e_1+\rho_1 u_1^2/2)=u_2(p_2+\rho_2 e_2+\rho_2 u_2^2/2) \quad (19)$$

where $\rho$ is density, u speed, p pressure. The symbol e represents internal energy per unit mass. The subscript "1" denotes upstream conditions, before the shock, and the subscript "2" denotes downstream conditions. If ideal gases are considered, the equation of state is $p=\rho(\gamma-1)e$. Eliminating the speeds results in the following relationship:

$$2(h_2 - h_1) = (p_2 - p_1) \cdot \left(\frac{1}{\rho_1} + \frac{1}{\rho_2}\right) \quad (20)$$

where $$h = \frac{p}{\rho} + e.$$

Using the ideal gas equation of state yields the following relation, which allows nonlinear waveform distortion in pressures upstream and downstream of the shock to be determined by:

$$\frac{p_1}{p_2} = \frac{(\gamma+1)-(\gamma-1)\frac{\rho_2}{\rho_1}}{(\gamma+1)\frac{\rho_2}{\rho_1}-(\gamma-1)} \quad (21)$$

The rest of the signal, away from the shocks, remains governed by the lossless Burgers' equation. Thus, two signals are tracked throughout the propagation process. The first pertain to the distorted waveform, unequal time spacing, and may include shocks. The second signal is interpolated from the distorted signal and can be used in dispersive calculations and spectral analysis.

The shock waves in sonic boom signals are affected by molecular relaxation and thermoviscous mechanisms in the atmosphere, which give them finite thickness, or "rise time." These effects are highly dependent on frequency, as well as ambient atmospheric properties (pressure, temperature, humidity, etc.). The time domain signal determined through the lossless Burgers' equation described above is periodically (e.g. every 50 feet along the propagation path) re-sampled and Fourier transformed into the frequency domain. The re-sampling causes the shocks to have a small non-zero thickness.

$$\hat{P}(\omega) = \frac{1}{2\pi}\int_{-\infty}^{\infty} p(t)e^{i\omega t}dt \quad (22)$$

With the signal in the frequency domain, frequency dependent coefficients for the attenuation of sound can be calculated $$\hat{P}(\omega) = \hat{P}(\omega)e^{-\hat{\alpha}\Delta x_d} \quad (23)$$

where $\Delta x_d$ is the distance propagated since the last application of dissipation, and $\hat{\alpha}$ is the complex atmospheric absorption coefficient. The real and imaginary parts of $\hat{\alpha}$ can be expressed as $$\Re[\hat{\alpha}(f)] = C_{tv} + A_r\left(\frac{f^3}{f^2+f_{r,O}^2}\right) + B_r\left(\frac{f^3}{f^2+f_{r,N}^2}\right) \quad (24)$$

$$\mathcal{J}[\hat{\alpha}(f)] = A_r\left(\frac{f^3}{f^2+f_{r,O}^2}\right) + B_r\left(\frac{f^3}{f^2+f_{r,N}^2}\right) \quad (25)$$

where $C_{tv}$ is a thermoviscous dissipation coefficient, $A_r$ and $B_r$ are relaxation coefficients for Oxygen and Nitrogen, and $f_{r,O}$ and $f_{r,N}$ are the relaxation frequencies of Oxygen and Nitrogen. These empirical quantities are dependent on the ambient temperature, temperature, and absolute humidity. They can be determined though the methods outlined in applicable ISO atmospheric standard(s). The complex atmospheric absorption coefficient can be re-calculated whenever dissipative effects are applied.

After application of the dissipative and dispersive mechanisms, the signal is inverse Fourier transformed back to the time domain as shown in equation (26):

$$p(t) = \int_{-\infty}^{\infty} \hat{P}(\omega)e^{i\omega t}d\omega \quad (26)$$

With the signal back in the time domain, process 112 continues the propagation, forming zero thickness shocks as necessary. As the boom signal gets closer to the ground, attenuation increases, especially at high frequencies, and zero-thickness shocks no longer form, so the final signal is smooth and continuous.

Process 112 can therefore include a smoothing process to eliminate oscillations due to modeling discontinuities with spectral methods, referred to as Gibbs oscillations. In some embodiments, process 112 assumes that the non-physical oscillations result in each point lying on the opposite side of the acoustic solution from the proceeding and following points. Accordingly, two signals can be formed, one using odd-numbered points, and the other using even points. The even and odd numbered signals can be averaged to provide a result that more closely approximates the physical signal. When strong compressions occur, other techniques that use more points may be used.

Process 114 includes determining the interaction of the shock signal with the ground. When a sonic boom signal reaches a listener at the ground, reflections and absorptions can significantly alter the signal. Most current sonic boom prediction methods assume perfect reflections from hard ground planes, which leads to a doubling of the signal amplitude. A more complex ground reflection and attenuation model can be implemented to account for soft or hard surfaces, variable incidence, and surface wave generation. A user may indicate the type of surface to be used via an input parameter as shown in Table 1 herein.

Noise metrics are useful for assessment of the perception, startle, and annoyance of sonic boom signals. In some embodiments, methods for determining the Perceived Level (PL) of noise, as specified in International Standards Organization (ISO) 532:1975 can be used. When process 110 and 112 determine the ground sonic boom signal, the narrow band and one-third octave band power spectra may also be determined. These spectra can then be used to determine the signal's Perceived Level, and A-weighted, C-weighted, and flat-weighted Sound Exposure Levels, as further specified in ISO532.

Process 116 can include adding background noise to the signal. A user may indicate one or more noise spectra to be used via an input parameter as shown in Table 1 herein. The addition of background noise allows for more realistic reproduction and simulation of the calculated signals.

Process 118 can include determining the acoustic level for specified azimuth angles around the aircraft. The acoustic levels at various azimuth angles can be used to generate the size and location of a carpet plot of the sonic boom, so that the entire noise field generated by the supersonic, maneuvering aircraft can be determined, and assessed.

Process 120 determines whether all the trajectory points have been completed. If not, control transitions to process 102 to begin processing the next trajectory path along the rays. When all trajectory points have been processed, process 122 generates the boom carpet file, which may be presented to a user via an interactive display and/or output to a file in text or binary values. The output file may be used to generate tables, graphs, charts, and any other desired output form. Process 124 can be included to generate a file that includes data regarding the locations of focused locations in the solutions.

Figure 4:
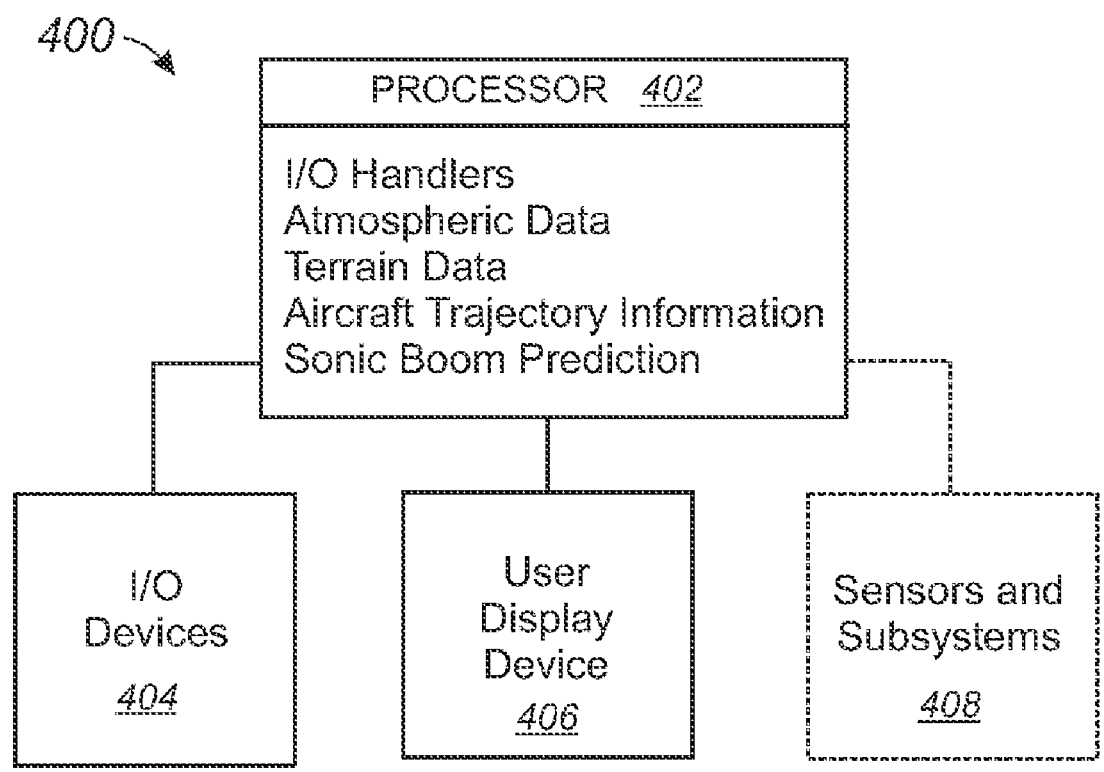
FIG. 4 is a diagram of an embodiment of system for determining the acoustic level of an aircraft.

Referring to FIG. 4, an embodiment of a processing system 400 is shown that can be used to implement process 100 (FIG. 1). System 400 can include a computer processor 402 configured to communicate with various input/output (I/O) devices 404, and a user display device 406. Process 100 can be implemented in a simulated analysis environment as well as onboard an aircraft. Accordingly, system 400 may include suitable databases, sensors, and/or subsystems 408 to provide atmospheric data, terrain data, aircraft velocity, acceleration, and location data, as well as other suitable data.

Processor 402 can be embodied in any suitable computing device(s) using any suitable combination of hardware, software, and/or firmware, such as microprocessors, Field Programmable Gate Arrays (FPGAs), Application Specific Integrated Circuit (ASICs), or other suitable devices and/or software modules. Information can be provided by sensors and databases onboard the vehicle or from a location remote from the vehicle. Communication with processor 402 from remote locations can be accomplished via one or more mobile or stationary communication links. The information to and from processor 402 can be accessed via a distributed or local computer network. Logic instructions and data associated with process 100 can also be distributed on computer readable media and transmitted over information networks for execution on other processors 402.

Processing system 400 and prediction process 100 were discussed herein as examples of types of systems and methods that can be used to provide information regarding the acoustic levels of the engine/airframe noise and shock wave generated by the aircraft. The output of system 400 and process 100 can be used to design vehicles to meet specified acoustic signature levels during expected operating conditions. Additionally, the output of system 400 and process 100 can be used during operation to alert crewmembers of the level of acoustic disturbance that has been caused, and/or is likely to be caused, under current or predicted flight conditions. Visual, aural, and/or other suitable cues may be provided to operators to indicate corrective action that may be taken to reduce disturbances. The actual and predicted acoustic levels may further be provided to an automated control system that operates the device autonomously (i.e., without operator input) to maintain acoustic disturbances within pre-specified levels.

Embodiments of system 400 and process 100 can be used for highly accurate prediction of sonic boom signals. Such predictions may be required for the assessment of supersonic cruise aircraft which are designed to produce low-amplitude sonic booms. The spectrally accurate nature of the predicted signals enables the calculation of various noise metrics, e.g. "Perceived Level". These metrics can be used to determine the acceptability of a civil aircraft for allowable supersonic cruise over land.

In some embodiments, system 400 and process 100 solve Burgers' equation for the nonlinear propagation of sound. The numerical solution of Burgers' equation is achieved with a mixed time-frequency domain approach. In the mixed approach, the hyperbolic, non-dissipative terms are solved analytically in the time domain, while the elliptic, dissipative and dispersive terms are added in the Frequency domain. The Fast Fourier Transform algorithm is used to switch between time and frequency domains. The effects caused by the propagation of sound through a layered atmosphere with winds are taken into account through the use of a geometric acoustics/ray tracing approach. Frequency dependant ground interaction effects are calculated with a semi-empirical surface impedance routine.

As described herein, system 400 and process 100 can utilize an accurate mixed time-frequency domain solution methodology, along with geometric acoustics/ray tracing for atmospheric and wind effects, as well as a complex ground interaction calculation. System 400 and process 100 automatically account for the lack of physical dissipation high in the atmosphere, and do not suffer from numerical dissipation errors prevalent in other techniques.

While the present disclosure describes various embodiments of acoustic signature displays, it will be understood that many variations and modifications of the embodiments disclosed herein may be made while remaining within the scope of the following claims. These embodiments are illustrative and the scope of the claims is not limited to them. For example, those having ordinary skill in the art will readily implement the processes necessary to provide the structures and methods disclosed herein, and will understand that materials, dimensions, processes, and other parameters can be varied to achieve desired apparatus, methods, and systems within the scope of the following claims. Further, other embodiments of displays, systems, sensors, processors, and methods can be configured to provide acoustic level information for operation of other types of vehicles and machinery besides aircraft in both autonomous and/or manual operating modes. In the claims, unless otherwise indicated the article "a" is to refer to "one or more than one".

What is claimed is:

1. A system for determining an acoustic signature of a device, comprising:
a computer processor configured with logic instructions operable to:
determine strength and location of shock waves in acoustic signals based on nonlinear propagation of sound generated by the device;
modify the strength and location of the shock waves due to dissipation and dispersion effects in a non-uniform atmosphere;
separate the acoustic signals into even and odd numbered signals; and
smooth oscillations in the signals by averaging the even and odd numbered signals.

2. The system according to claim 1 further comprising an input file specifying parameters including at least one of the group consisting of: atmospheric properties, a propagation increment along a ray tube, an azimuth increment, an altitude interval between atmospheric absorption applications, a ground surface type, a spectral analysis rate, a background noise spectrum, and transient maneuver rates.

3. The system according to claim 1 wherein the processor is further operable to determine a near-field static pressure signal for the device.

4. The system according to claim 1 wherein the processor is further operable to increment propagation segments from an altitude of the device to a ground location, and determine the acoustic signals along the propagation segments.

5. The system according to claim 1 wherein the processor is further operable to
determine whether the acoustic signals are focused; and
determine location and strength of the acoustic signals when the signals are focused.

6. The system according to claim 1 wherein the processor is further operable to determine a first shock wave signal that pertains to a distorted acoustic signal, and a second shock wave signal that is interpolated from the distorted acoustic signal and is used in dispersive calculations and spectral analysis.

7. The system according to claim 6 wherein the processor is further operable to transform the second shock wave signal from a time domain to a frequency domain, and adjust the second shock wave signal for atmospheric variations in the frequency domain.

8. The system according to claim 7 wherein the processor is further operable to apply background noise to the second shock wave signal.

9. The system according to claim 6 wherein the processor is further operable to adjust the second shock wave signal based on varied ground surface characteristics.

10. The system according to claim 1 wherein the processor is further operable to determine acoustic levels for specified azimuth angles around the device.

11. The system according to claim 1 wherein the processor is further operable to generate size and location of a carpet boom plot for the device.

12. A method for predicting the acoustic signature of a device, comprising:
  determining strength and location of shock sound signals based on propagation of acoustic signals generated by the device;
  modifying the strength and location of the acoustic signals due to dissipation and dispersion effects in a non-uniform atmosphere; and
  determining a first shock wave signal that pertains to a distorted acoustic signal, and a second shock wave signal that is interpolated from the distorted acoustic signal and used in dispersive calculations and spectral analysis.

13. The method according to claim 12 further comprising accessing an input file specifying parameters including at least one of the group consisting of: atmospheric properties, a propagation increment along a ray tube, an azimuth increment, an altitude interval between atmospheric absorption applications, a ground surface type, a spectral analysis rate, a background noise spectrum, and transient maneuver rates.

14. The method according to claim 12 further comprising determining a near-field static pressure signal for the device.

15. The method according to claim 12 further comprising incrementing propagation segments from an altitude of the device to a ground location, and determining the acoustic signals along the propagation segments.

16. The method according to claim 12 further comprising:
  determining whether the acoustic signals are focused; and
  determining location and strength of the acoustic signals when the acoustic signals are focused.

17. The method according to claim 12 further comprising:
  separating the shock wave signals into even and odd numbered signals; and
  smoothing oscillations in the shock wave signals by averaging even and odd numbered signals.

18. The method according to claim 17 further comprising transforming the second shock wave signal from a time domain to a frequency domain, and adjusting the second shock wave signal for atmospheric variations in the frequency domain.

19. The method according to claim 18 further comprising applying background noise to the second shock wave signal.

20. The method according to claim 12 further comprising adjusting the second shock wave signal based on varied ground surface characteristics.

21. The method according to claim 12 further comprising determining acoustic levels for specified azimuth angles around the device.

22. The method according to claim 12 further comprising generating size and location of a carpet boom plot for the device.

23. A computer program product comprising:
  logic instructions on computer readable media operable to cause a computer processor to:
    determine strength and location of shock waves in acoustic signals based on nonlinear propagation of sound generated by a device; and
    determine a first shock wave signal that pertains to a distorted acoustic signal, and a second shock wave signal that is interpolated from the distorted acoustic signal and is used in dispersive calculations and spectral analysis.

24. The product according to claim 23 further comprising an input file specifying parameters including at least one of the group consisting of: atmospheric properties, a propagation increment along a ray tube, an azimuth increment, an altitude interval between atmospheric absorption applications, a ground surface type, a spectral analysis rate, a background noise spectrum, and transient maneuver rates.

25. The product according to claim 23 wherein the logic instructions are further operable to increment propagation segments from an altitude of the device to a ground location, and determine the acoustic signals along the propagation segments.

26. The product according to claim 23 wherein the logic instructions are further operable to
  determine whether the acoustic signals are focused; and
  determine location and strength of the acoustic signals when the signals are focused.

27. The product according to claim 23 wherein the logic instructions are further operable to transform the second shock wave signal from a time domain to a frequency domain, and adjust the second shock wave signal for atmospheric variations in the frequency domain.

28. The product according to claim 23 wherein the logic instructions are further operable to perform at least one of the group consisting of: apply background noise to the second shock wave signal, adjust the second shock wave signal based on varied ground surface characteristics, determine acoustic levels for specified azimuth angles around the device, and generate size and location of a carpet boom plot for the device.

* * * * *